United States Patent
Nam (10) Patent No.: US 7,492,403 B2
(45) Date of Patent: Feb. 17, 2009

(54) SOLID STATE IMAGE SENSING DEVICE AND DRIVING METHOD WITH SUB-SAMPLING MODE AND IMPROVED DYNAMIC RANGE

(75) Inventor: Jung-Hyun Nam, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 793 days.

(21) Appl. No.: 10/979,063

(22) Filed: Nov. 2, 2004

(65) Prior Publication Data

US 2005/0140806 A1    Jun. 30, 2005

(30) Foreign Application Priority Data

Dec. 30, 2003    (KR) .................. 10-2003-0100642

(51) Int. Cl.
  *H04N 3/14*    (2006.01)
  *H04N 5/335*    (2006.01)
(52) U.S. Cl. ....................... 348/311; 348/280
(58) Field of Classification Search ................. 348/320, 348/322, 311, 230.1, 316, 220.1, 223.1, 264, 348/266, 272, 280, 282, 294, 303, 312
  See application file for complete search history.

(56) References Cited

U.S. PATENT DOCUMENTS

| 5,847,758 | A  | * | 12/1998 | Iizuka | ................... | 348/317 |
| 6,661,451 | B1 | * | 12/2003 | Kijima et al. | ............. | 348/220.1 |
| 6,686,960 | B2 | * | 2/2004 | Iizuka | ................... | 348/273 |
| 6,930,716 | B2 | * | 8/2005 | Yoshida | ................... | 348/322 |
| 2003/0030737 | A1 | * | 2/2003 | Yanai | ................... | 348/296 |
| 2003/0086005 | A1 | * | 5/2003 | Nakamura | ............. | 348/223.1 |

FOREIGN PATENT DOCUMENTS

| JP | 01-160924 | 6/2001 |
| JP | 03-143614 | 5/2003 |
| KR | 1999-1444 | 1/1993 |
| KR | 10-13743 | 1/1998 |

OTHER PUBLICATIONS

English Abstract Only.

* cited by examiner

*Primary Examiner*—Lin Ye
*Assistant Examiner*—Dennis Hogue
(74) *Attorney, Agent, or Firm*—F. Chau & Associates, LLC

(57) ABSTRACT

A solid state image sensing device and method of driving provide a sub-sampling mode for improving a dynamic range in the solid state image sensing device by using vertical driving electrodes that receive inputs of vertical driving signals, a vertical CCD that receives each of video signals of a plurality of rows that are arranged at intervals of one row, and adding the received signal with the video signal of a row which is a proportional number of rows distant from the row of the received signal, in which the proportional number is proportional to the number of the plurality of rows, and vertically transmitting the result; and by using horizontal driving electrodes that receive inputs of horizontal driving signals, a horizontal CCD receives the added video signals, again adds sequentially the same number of the added video signals as the number of the plurality of rows, and horizontally transmits and outputs the video signals added by row.

20 Claims, 10 Drawing Sheets

SOLID STATE IMAGE SENSING DEVICE AND DRIVING METHOD WITH SUB-SAMPLING MODE AND IMPROVED DYNAMIC RANGE

CROSS-REFERENCE TO RELATED APPLICATION

This application claims foreign priority under 35 U.S.C. § 119 to Korean Patent Application No. 2003-100642, filed on Dec. 30, 2003, in the Korean Intellectual Property Office, the disclosure of which is incorporated herein by reference in its entirety.

BACKGROUND OF THE INVENTION

1. Field of the Invention

The present invention relates to a solid-state image-sensing device, and more particularly, to a charge coupled device (CCD) type solid-state image sensing device.

2. Description of the Related Art

A CCD type solid-state device is typically embedded in mobile phone cameras and digital still cameras. It senses an image coming into view, converts into an electric signal, and transmits the signal to a display driving apparatus. The display driving apparatus processes signals for color image data (R, G, and B) output from the solid-state device and drives a display apparatus such as a liquid crystal display (LCD). In particular, in a system employing a CCD solid-state device, a sub-sampling mode of the solid-state device is a mode in which vertical resolution is lowered without changing the driving frequency and a full frame image signal is output. This sub-sampling mode is performed to quickly process a signal in steps that do not need a high-resolution display, such as a step for confirmation in advance before photographing a desired image, and a step for setting auto focus.

Figure 1:
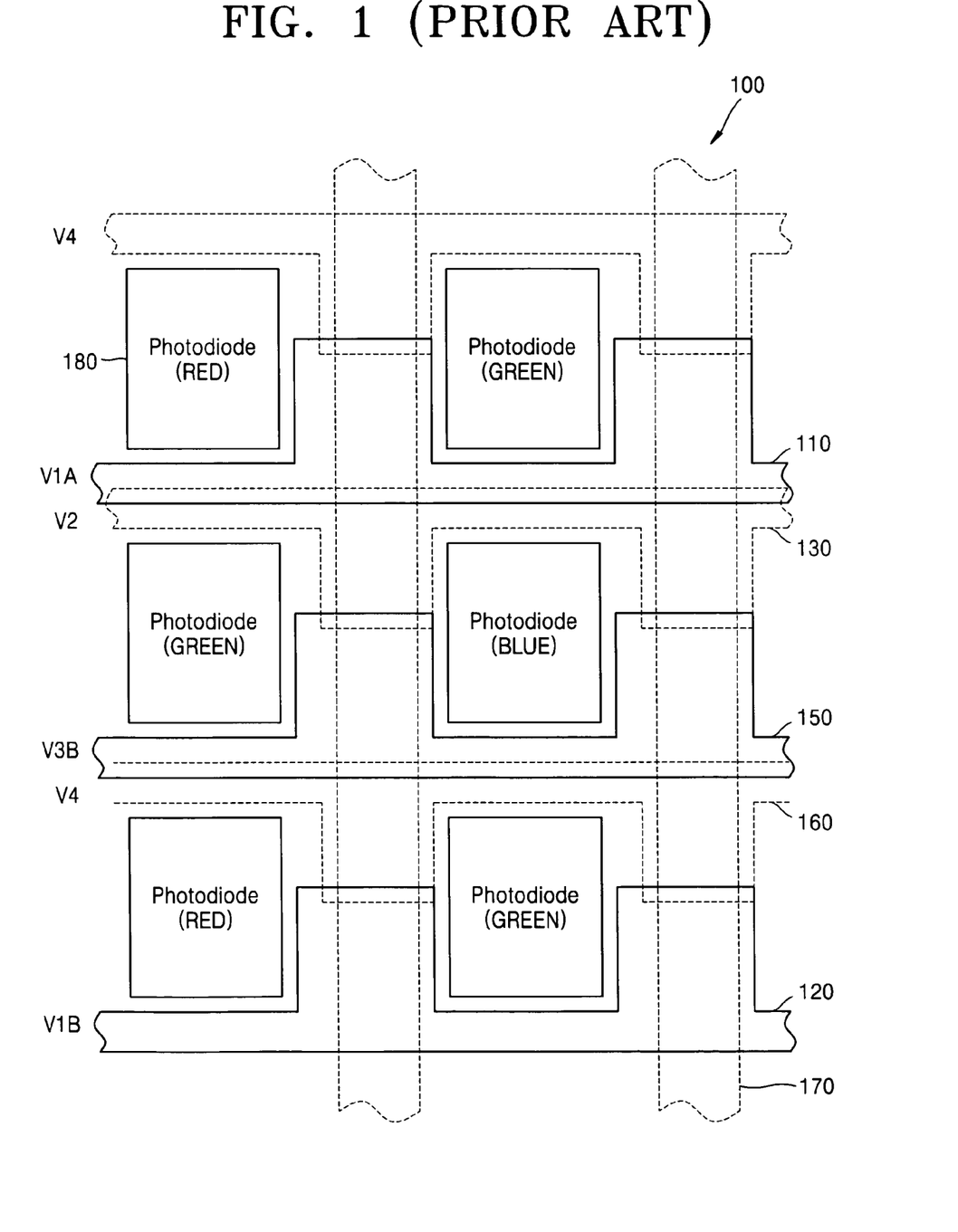
FIG. 1 is a diagram of the pixel structure of an ordinary CCD solid-state image-sensing device.

FIG. 1 shows the pixel structure of a conventional CCD solid-state image-sensing device, which is indicated generally by the reference numeral 100. Referring to FIG. 1, the conventional CCD solid state image sensing device 100 is designed to use an interlacing method, and has a pixel structure having a two-dimensionally (2D) disposed photodiode matrix 180 and a vertical CCD 170 connected to the photodiodes 180. Normally in a color solid-state device, a color filter is installed on the top of each pixel so that light of only a predetermined color can be received. In order to form color signals, at least three types of color filters are disposed. A most widely used color filter array is Bayer pattern, as used in the device 100, in which two color patterns of red (R) and green (G) are disposed in one row and two color patterns of green (G) and blue (B) are disposed in the other row and these rows are repeatedly arranged. At this time, green (G) color closely related to a luminance signal is disposed in all rows and red (R) color and blue (B) color are disposed diagonally so that luminance resolution can increase. In digital still cameras and the like, in order to increase resolution, a CCD with one million or more pixels disposed has been employed. In particular, this conventional solid-state device is designed to fit the interlacing method and the vertical CCD 170 is driven by a plurality of driving signals (V1A, V1B, V2, V3A, V3B, and V4). The general driving method of this ordinary solid-state device is shown in Japanese Patent Publication No. 2001-160924.

Figure 2:
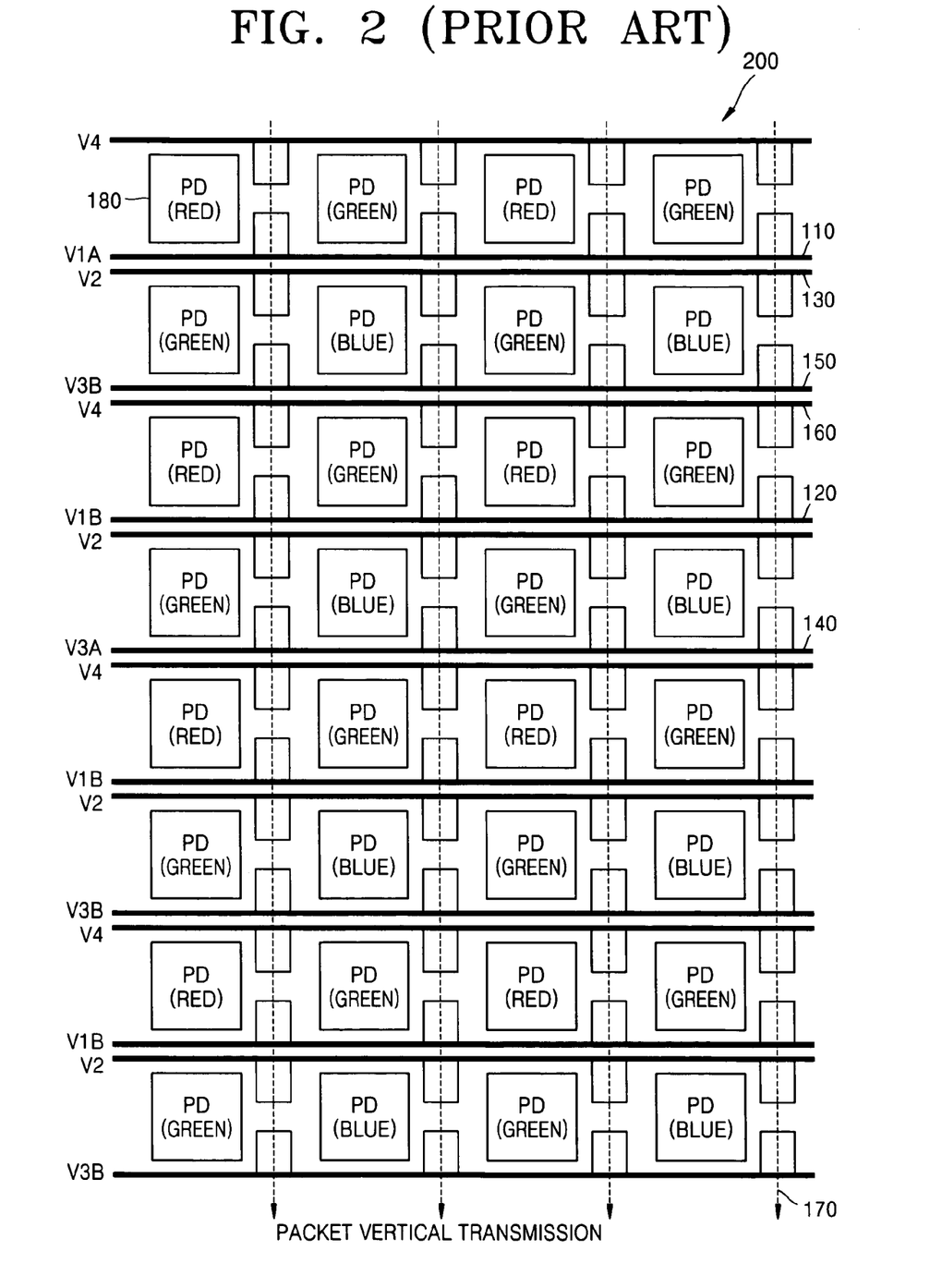
FIG. 2 is a schematic diagram showing an 8-matrix pixel structure of the solid-state image-sensing device of FIG. 1.

FIG. 2 shows a conventional 8-matrix pixel structure of the solid-state image-sensing device 100 of FIG. 1, indicated generally by the reference numeral 200. That is, although driving electrodes 110 through 160 for transferring signals (V1A, V1B, V2, V3A, V3B, and V4) driving the vertical CCD 170 are shown in FIG. 2 separated between photodiodes 180, the electrodes are overlapping each other in internally different layers of the device 100 as shown in FIG. 1. In the case of a monochrome CCD sensing only brightness of light, sub-sampling mode can be implemented by adding signals of neighboring rows and transmitting. However, in the case of a color CCD to obtain three color signals (R, G, and B), there is a constraint that signals of neighboring rows corresponding to an identical color should be added. Accordingly, in order to implement a sub-sampling mode, signals of some rows connected to V1A and V3A are output by the pixel structure and driving signals (V1A, V1B, V2, V3A, V3B, and V4) of the structure 200, through the vertical CCD 170 and horizontal CCD 190 as discussed below with respect to FIG. 3, and signals of the remaining rows are not output and are discarded.

Figure 3:
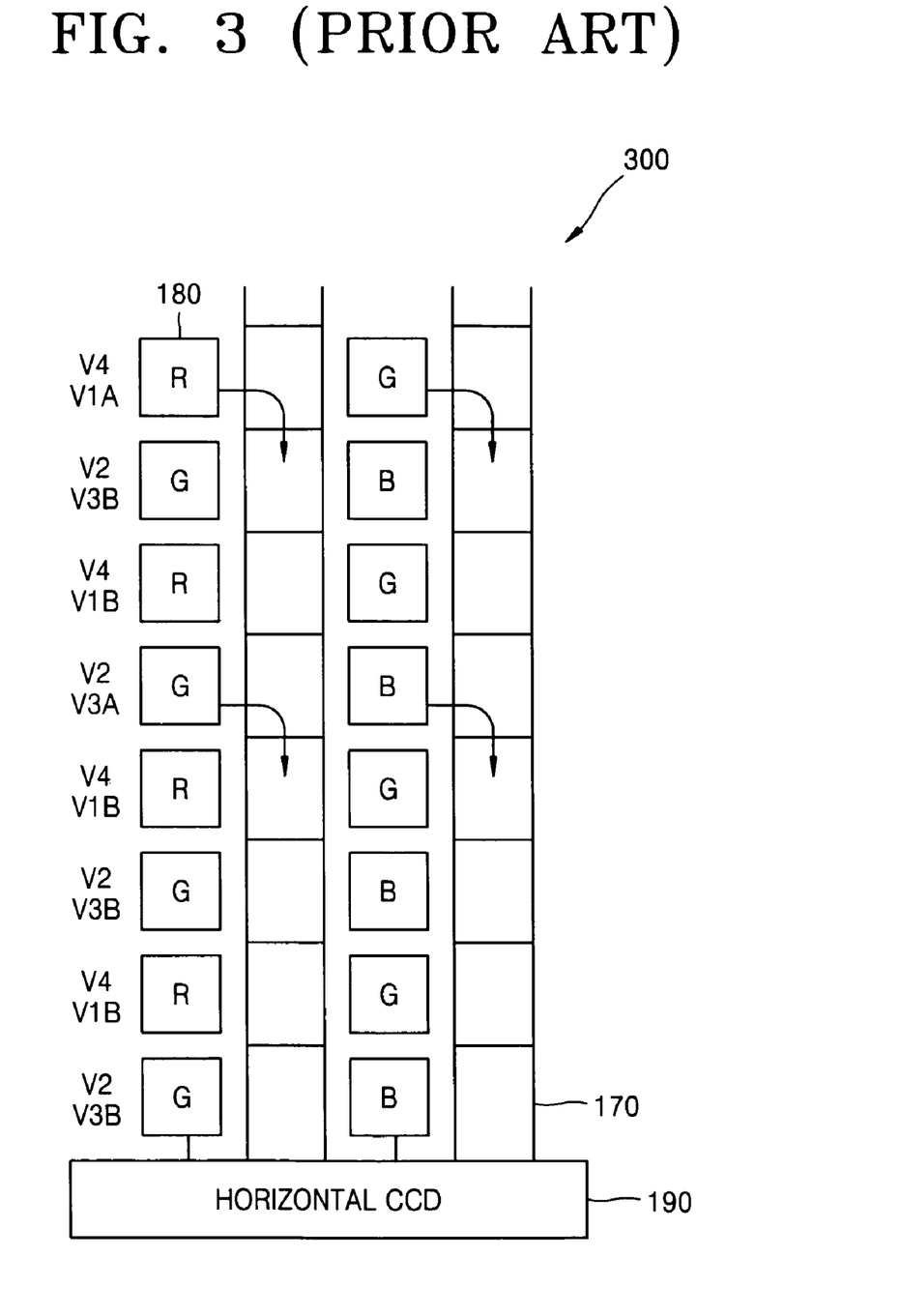
FIG. 3 is a diagram explaining a sub-sampling mode operation of the solid-state image-sensing device of FIG. 2.

FIG. 3 shows a conventional sub-sampling mode of operation for the solid-state image-sensing device of FIG. 2, indicated generally by the reference numeral 300. When a user takes desired pictures, usually the video signal of all pixels sensed by the photodiodes 180 are output through the vertical CCD 170 and the horizontal CCD 190. However, in the sub-sampling mode 300, vertical resolution is lowered and then the video signal is output. The exemplary operation 300 senses the video signal in only two rows of pixels among eight rows of pixels, which are selected and output with the vertical resolution lowered down to ¼. That is, first, the mechanical shutter is opened and signal charges are accumulated in the photodiodes 180 for a predetermined time. Then, if an active signal for readout is applied to the driving electrodes 110 and 140 transferring V1A and V3A among vertical driving signals, video signals of the corresponding one (R. G) row and one (G, B) row are transmitted to the vertical CCD 170, and video signals packets thus transmitted to the vertical CCD 170 are vertically transmitted by the vertical CCD driving signals (V1A, V1B, V2, V3A, V3B, and V4) from the vertical CCD 170 to the horizontal CCD 190. The horizontal CCD 190 receives transmitted video signal packets and horizontally transmits by horizontal driving signals (VH1 and VH2) so that video signals for respective rows are output sequentially.

However, in the conventional CCD solid'state image sensing device and the sub-sampling mode, in order to perform vertical sub-sampling, only video signals of predetermined rows at predetermined intervals are transferred to the vertical CCD 170, and then these are output through the vertical CCD 170 and the horizontal CCD 190 such that sub-sampling mode to lower the vertical resolution is performed. Accordingly, at this time there are video signals of rows that are not output, which cause aliasing noise in which slant lines are not smoothly displayed on the display and appear in the shape of stairs. In addition, there is a problem that by outputting only part of the generated signal charges, the dynamic range of the video signals is reduced.

SUMMARY OF THE INVENTION

Embodiments of the present disclosure provide solid-state image sensing devices that improve the dynamic range and display quality of an output signal during operation in a sub-sampling mode.

Embodiments of the present disclosure also provide a method for driving such solid-state image sensing devices.

According to an aspect of the present disclosure, there is provided a solid-state image sensing device comprising photodiodes, a vertical charge coupled device (CCD), and a horizontal CCD. The photodiodes are disposed in a two-dimensional matrix, with each photodiode sensing light, converting the light into an electric signal, and generating a video signal. By using vertical driving electrodes that receive inputs of vertical driving signals, the vertical CCD receives video signals of a plurality of rows that are arranged at intervals of one row, and adds the received signal with the video signal of a row which is a proportional number of rows distant from the row of the received signal, in which the proportional number is proportional to the number of the plurality of rows, and vertically transmits the result. By using horizontal driving electrodes that receive inputs of horizontal driving signals, the horizontal CCD receives the added video signals, adds sequentially the same number of the added video signals as the number of the plurality of rows, and horizontally transmits and outputs the video signals added by row.

In a first mode, the vertical CCD vertically transmits for four rows, each of the video signals of two rows having an interval of one row; and in a second mode, the vertical CCD adds each of the vertically transmitted video signals with the video signal of a current row, then vertically transmits the result, and outputs to the horizontal CCD; and the first mode and the second mode are repeated in each frame unit.

In the first mode, the vertical CCD sequentially vertically transmits for four rows, a first color signal of the two rows having an interval of one row, and a second color signal of another two rows having an interval of one row and placed five rows distant from the two rows; and in the second mode, adds each of the vertically transmitted video signals with the video signal of a current row, then sequentially vertically transmits the result, and outputs to the horizontal CCD.

Through another neighboring column, the vertical CCD sequentially vertically transmits for four rows, a third color signal and the first color signal in the first mode; and in the second mode, adds each of the vertically transmitted video signals with the video signal of a current row, and then, sequentially vertically transmits the result. The first through third color signals form a Bayer pattern. In a sub-sampling mode of driving, the vertical CCD vertically transmits a signal obtained by adding video signals of predetermined rows without discarded video signals.

According to another aspect of the present invention, there is provided a method for driving a solid state image sensing device comprising disposing photodiodes in a two-dimensional matrix sensing light, converting the sensed light into an electric signal, and generating a video signal; by using vertical driving electrodes that receive inputs of vertical driving signals, receiving each of video signals of a plurality of rows that are arranged at intervals of one row, and adding the received signal with the video signal of a row which is a proportional number of rows distant from the row of the received signal, in which the proportional number is proportional to the number of the plurality of rows, and vertically transmitting the result; and by using horizontal driving electrodes that receive inputs of horizontal driving signals, receiving the added video signals, again adding sequentially the same number of the added video signals as the number of the plurality of rows, and horizontally transmitting and outputting the video signals added by row.

BRIEF DESCRIPTION OF THE DRAWINGS

The above and other features and advantages of the present invention will become more apparent by describing in detail exemplary embodiments thereof with reference to the attached drawings, in which:

FIGS. 6a through 6d are diagrams for explanation of the operation of the solid state image sensing device of FIG. 5.

DESCRIPTION OF THE PREFERRED EMBODIMENTS

The attached drawings for illustrating preferred embodiments of the present disclosure are referred to in order to gain a sufficient understanding of the present disclosure, the merits thereof, and the objectives accomplished by the implementation of the present disclosure.

Hereinafter, the present disclosure will be described in detail by explaining preferred embodiments of the disclosure with reference to the attached drawings. In the drawings, whenever the same element reappears in subsequent drawings, it is denoted by the same reference numeral.

Figure 4:
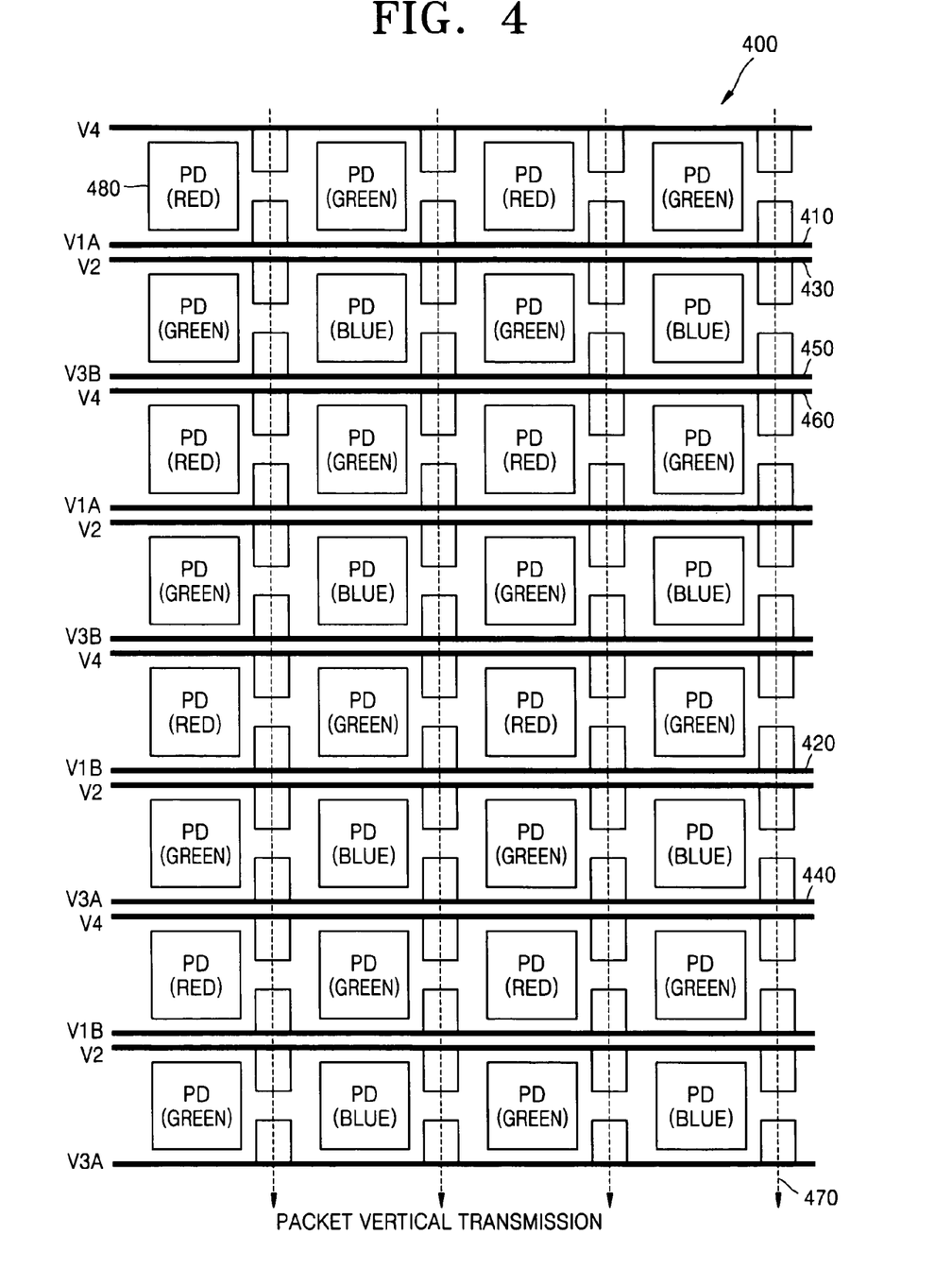
FIG. 4 is a diagram showing the pixel structure of a CCD solid-state image-sensing device according to a preferred embodiment of the present invention.

FIG. 4 is a diagram showing the pixel structure of a CCD solid-state image-sensing device according to a preferred embodiment of the present disclosure, and indicated generally by the reference numeral 400. Referring to FIG. 4, the CCD solid-state image-sensing device comprises photodiodes 480 and a vertical CCD 470. A video signal output from the vertical CCD 470 is transferred to a horizontal CCD 490 as shown in FIGS. 6a through 6d. In FIG. 4, though driving electrodes 410 through 460 transferring signals (V1A, V1B, V2, V3A, V3B, and V4) driving the vertical CCD 470 are shown separated between photodiodes 480, it is assumed that the electrodes are overlapping each other in internally different layers as well known, in order to vertically transmit signal charges transferred from the photodiodes 480.

As well known, a CCD solid state image sensing device embedded in a mobile phone camera, a digital still camera and the like, takes pictures coming into view, converts into electric signals, and outputs video signals. The solid-state image sensing device sense external light by using photodiodes 480, converts into an electric signal, and outputs a video signal. The photodiodes 480 form a pixel array in the form of a 2-dimensional matrix. The solid state image sensing device receives vertical driving signals (V1A, V1B, V2, V3A, V3B, and V4) for driving the vertical CCD 470 and horizontal driving signals (VH1 and VH2) for driving the horizontal CCD 490, and outputs a video signal sensed by the photodiodes 480 on the pixel array. Three color signals (R, G, and B) output from the solid state image sensing device are processed in a predetermined video signal processing unit and then, output to and displayed on a display apparatus such as an LCD. Here, though it is assumed that the pixel array pattern is Bayer pattern here, it can be formed in a variety of ways and is not restricted to Bayer pattern. The solid-state image-sensing device will now be explained in more detail.

Meanwhile, in FIG. 4, the photodiodes 480 are disposed in a two-dimensional matrix on a pixel array as in the conventional array and sense light, convert it into electric signals, and generate video signals. It is assumed that a Bayer pattern color filter array is disposed on the top of a photodiode 480 forming each pixel as described above. By using vertical driving electrodes 410 through 460 receiving vertical driving signals (V1A, V1B, V2, V3A, V3B, and V4), the vertical CCD 470 receives video signals sensed in the photodiodes 480, and outputs to the horizontal CCD 490 through vertical transmission. By using horizontal driving electrodes (not shown) receiving horizontal driving signals (VH1 and VH2), the horizontal CCD 490 outputs video signals for respective rows through horizontal transmission.

In particular, in operating sub-sampling mode to lower the vertical resolution, the CCD solid state image sensing device according to a preferred embodiment of the present disclosure utilizes video signals of all rows without video signals that are not output and are discarded. That is, unlike the conventional method in which in order to form a frame with a lowered resolution, only video signals of predetermined rows at predetermined intervals are output, the CCD solid state image sensing device according to the preferred embodiment of the present disclosure adds up video signals of neighboring rows having an identical color and outputs the added signals. Here, in the case of a sub-sampling mode operation for ¼ vertical resolution reduction, video signals of four neighboring rows having an identical color are added and in the case of a sub-sampling mode operation for ⅙ vertical resolution reduction, video signals or six neighboring rows having an identical color are added. Likewise, according to the number of rows whose video signals are added up, ⅛ or ¹⁄₁₀ vertical resolution reduction is possible.

The operations of the vertical CCD 470 and the horizontal CCD 490 when this sub-sampling mode operation for vertical resolution reduction is performed will now be explained in more detail.

Figure 5:
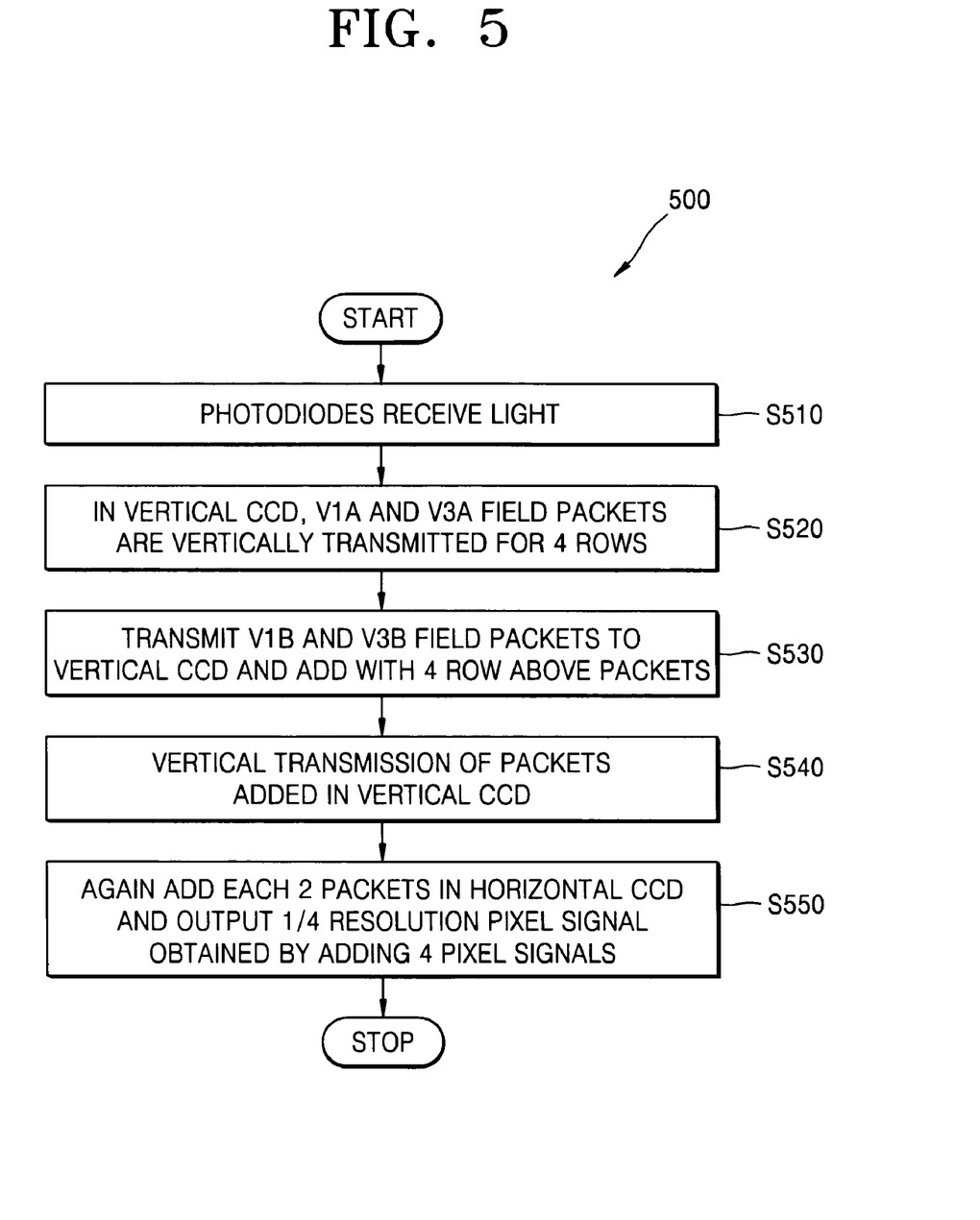
FIG. 5 is a flowchart of the steps explaining the sub-sampling mode of operation of the solid-state image-sensing device of FIG. 4.

FIG. 5 is a flowchart of the steps explaining the sub-sampling mode operation of the solid-state image-sensing device of FIG. 4, and indicated generally by the reference numeral 500.

FIGS. 6a through 6d are diagrams for explanation of the operation of the solid-state image-sensing device of FIG. 5, which are indicated generally by the reference numerals 600, 620, 640 and 660, respectively. Here, an example of a sub-sampling mode operation for ¼ vertical resolution reduction will be explained.

Referring back to FIG. 5, first, the mechanical shutter is opened for a predetermined time so that signal charges are accumulated in the photodiodes 480 in step S510. Next, in the first mode, if an active signal for readout is applied to driving electrodes 410 and 440 transferring V1A and V3A among vertical driving signals (V1A, V1B, V2, V3A, V3B, and V4), then corresponding video signals, that is, corresponding video signal (R5, G11, . . . , R6, G12, . . . ) in (R, G) rows and corresponding video signals (G3, B3, . . . , G4, B4, . . . ) in (G, B) rows, are transferred by the photodiodes 480 to the vertical CCD 470. V1A and V3A field packets (refer to FIGS. 6a and 6b) thus transferred to the vertical CCD 470 are vertically transmitted for four rows in the direction of the horizontal CCD 490 in the vertical CCD 470, by vertical driving signals (V1A, V1B, V2, V3A, V3B, and V4) in step S520.

Figure 6A:
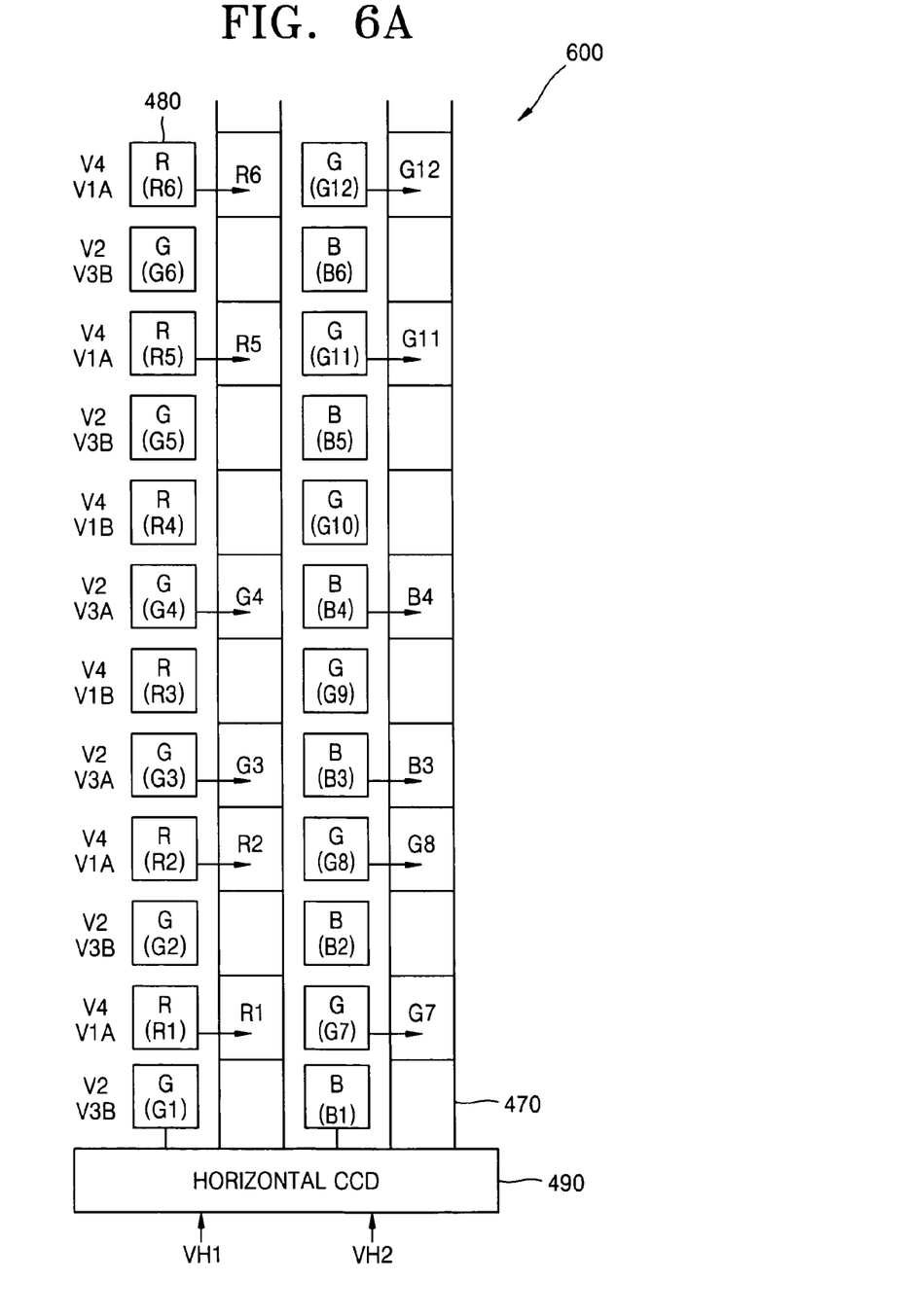
Figure 6B:
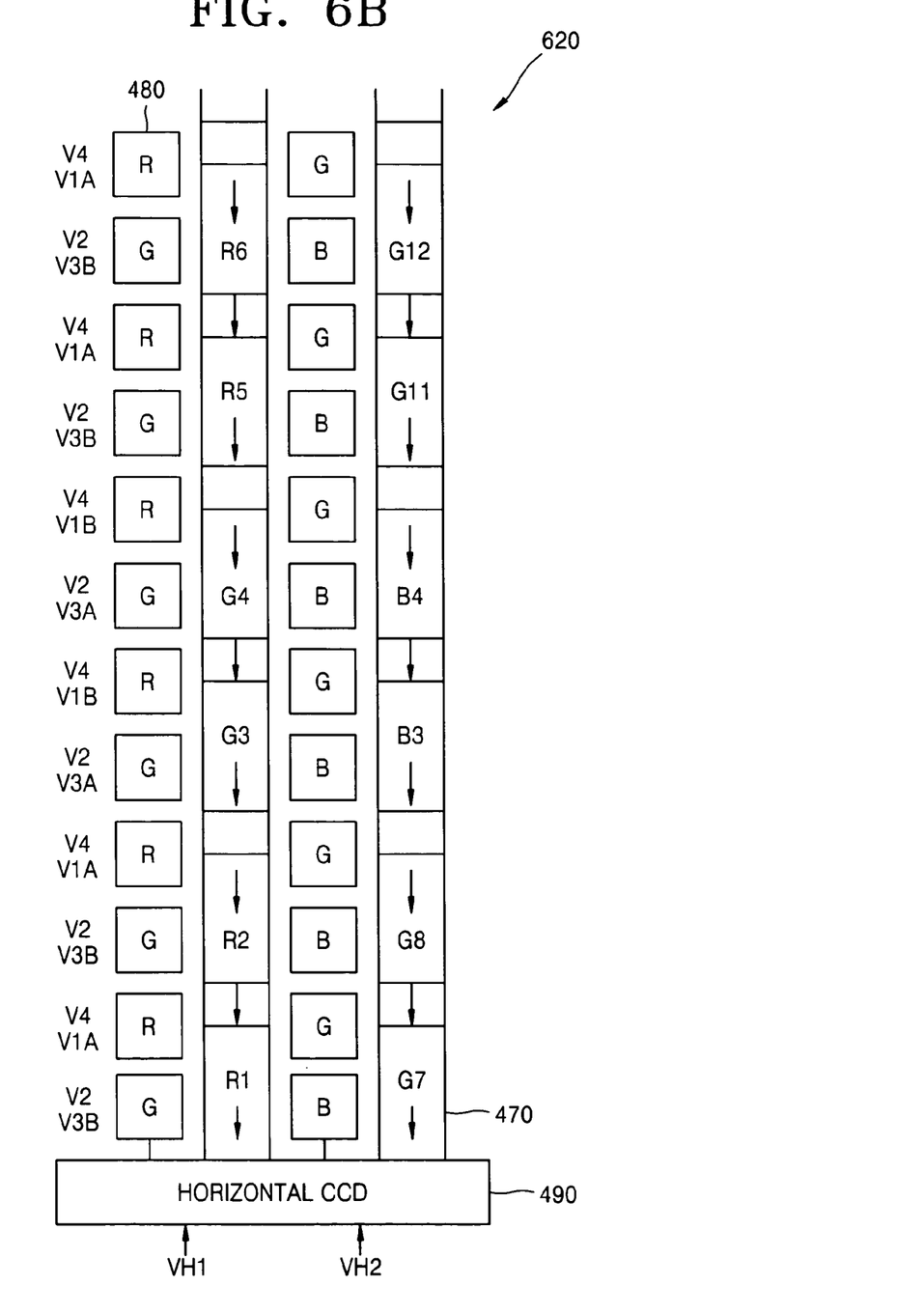

Here, referring to FIGS. 6a and 6b, V1A field packet is video signals R5, G11, . . . , R6, G12, . . . that forming (R, G) rows, while V3A field packet is video signals G3, B3, . . . , G4, B4, . . . that forming (G, B) rows.

In operating sub-sampling mode for ¼ vertical resolution reduction, in the first mode, V1A and V3A field packets are vertically transmitted for four rows in the direction of the horizontal CCD 490 in the vertical CCD 470. However, for ⅙, ⅛, and ¹⁄₁₀ vertical resolution reductions, three, four, and five field packets should be vertically transmitted in the direction of the horizontal CCD 490 in the vertical CCD 470 for six rows, eight rows, and ten rows, respectively.

Figure 7:
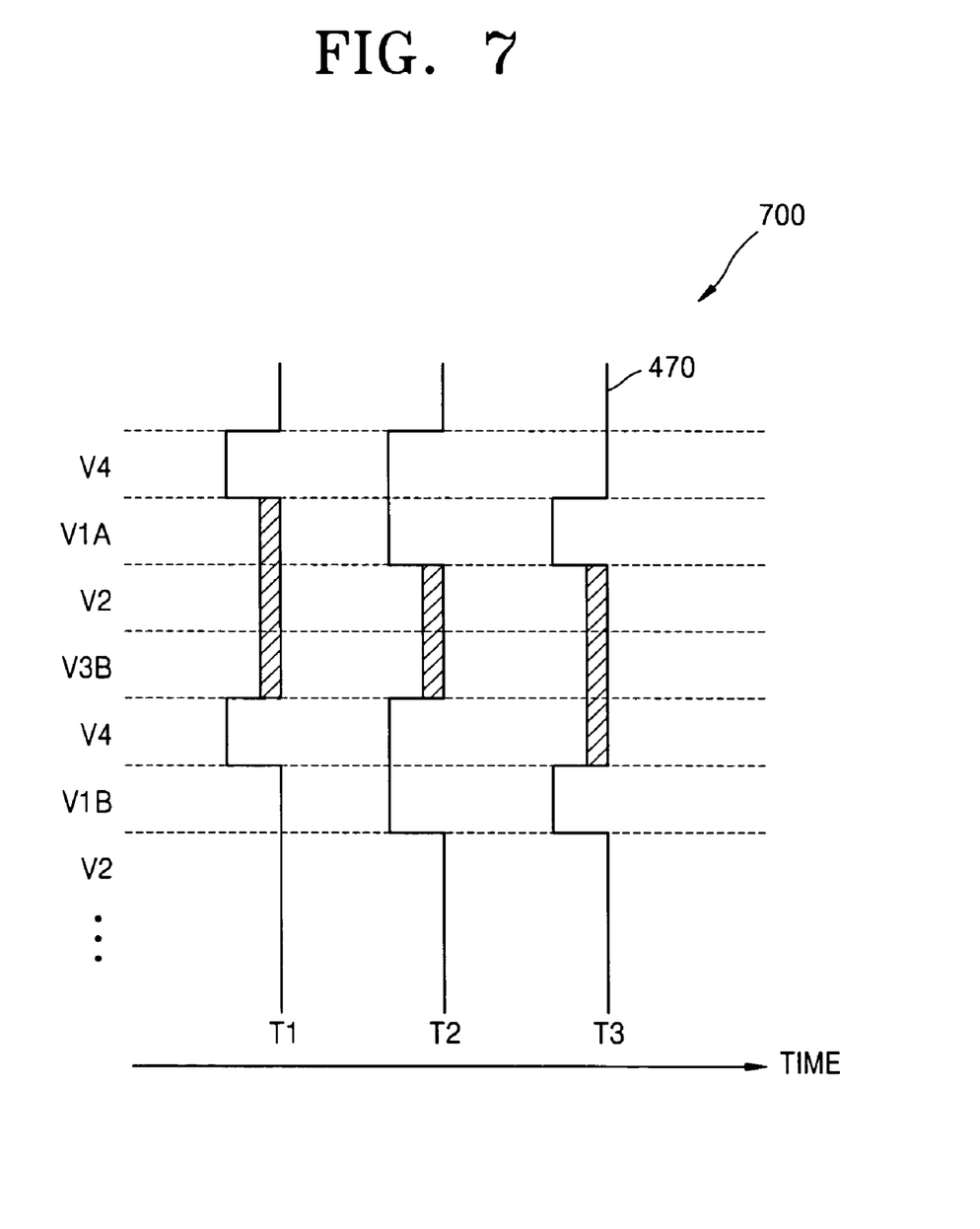
FIG. 7 is a diagram explaining a vertical transmission method of an electric charge packet of the CCD solid-state image-sensing device of FIG. 4.

FIG. 7 is a diagram explaining a vertical transmission method of an electric charge packet of the CCD solid-state image-sensing device of FIG. 4, and indicated generally by the reference numeral 700. FIG. 7 shows an example in which the vertical CCD 470 vertically transmits electric charge corresponding to video signal R6 of FIG. 6a by vertical driving signals (V1A, V1B, V2, V3A, V3B, and V4). A method for transmitting an electric charge packet of a CCD solid state image sensing device is well know and therefore will not be explained in detail here. In the first mode, when an active signal in a second logic state (a "high" logic level) for readout is applied to driving electrodes 410 and 440 transferring V1A and V3A among vertical driving signals (V1A, V1B, V2, V3A, V3B, and V4), V4 among vertical driving signals (V1A, V1B, V2, V3A, V3B, and V4) in FIG. 6a outputs a signal in a first logic state (a "low" logic level). FIG. 7 shows an energy diagram formed by vertical driving signals (V1A, V1B, V2, V3A, V3B, and V4) when electric charge corresponding to video signal R is vertically transmitted, and the vertical movement of a signal charge. First, at T1, by vertical driving signal V4 which is not activated, and vertical driving signals V1A, V2, and V3B that are activated, the electric charge corresponding to video signal R6 is distributed along electrodes 410, 430, and 450 where vertical driving signals V1A, V2, and V3B are arranged. At T2, by activated vertical driving signals V2 and V3B, the signal charge is distributed along electrodes 430 and 450 where V2 and V3B are arranged. At T3, by activated vertical driving signals V2, V3B, and V4, the signal charge is distributed along electrodes 430, 450, and 460 where V2, V3B, and V4 are arranged. The signal charge transferred to the vertical CCD 470 by photodiodes 480 are vertically transmitted by this well known method.

Thus, in the first mode, the vertical CCD 470 receives each of video signals of a plurality of rows (two rows when ¼ vertical resolution reduction), and vertically transmits for a proportional number of rows (four rows when ¼ vertical resolution reduction) of the number of the plurality of rows. At this time, the vertical CCD 470 sequentially vertically transmits for four rows along the first column, signals (for example, G3, and G4) having a first color (green) of two rows at interval of one row, and signals (for example, R5 and R6) having a second color (red) of another two rows at interval of one row and placed five rows distant from the rows of the signals (G3 and G4). Likewise, in the first mode, the vertical CCD 470 sequentially vertically transmits for four rows along the second column, signals (for example, B3 and B4) having a third color (blue) and signals (for example, G11, and G12) having the first color (green).

Next, in the second mode period, if an active signal for readout is applied to driving electrodes 420 and 450 transferring V1B and V3B among vertical driving signals (V1A, V1B, V2, V3A, V3B, and V4), video signals of a current row, that is, corresponding video signals (R3, G9, . . . , R4, G10, . . . ) in (R, G) rows and corresponding video signals (G1, B1, . . . , G2, B2, . . . ) in (G, B) rows, are transferred from the photodiodes 480 to the vertical CCD 470, and V1B and V3B field packets (refer to FIGS. 6c and 6d) thus transferred to the vertical CCD 470 are added with V1A and V3A field packets of four rows above generated in the first mode, and then vertically transmitted S530. Here, referring to FIGS. 6c and 6d, V1B field packet is video signals R3, G9, . . . , R4, G10, . . . that form (R, G) rows, and V3B field packet is video signals G1, B1, . . . , G2, B2, . . . that form (G, B) rows.

Figure 6C:
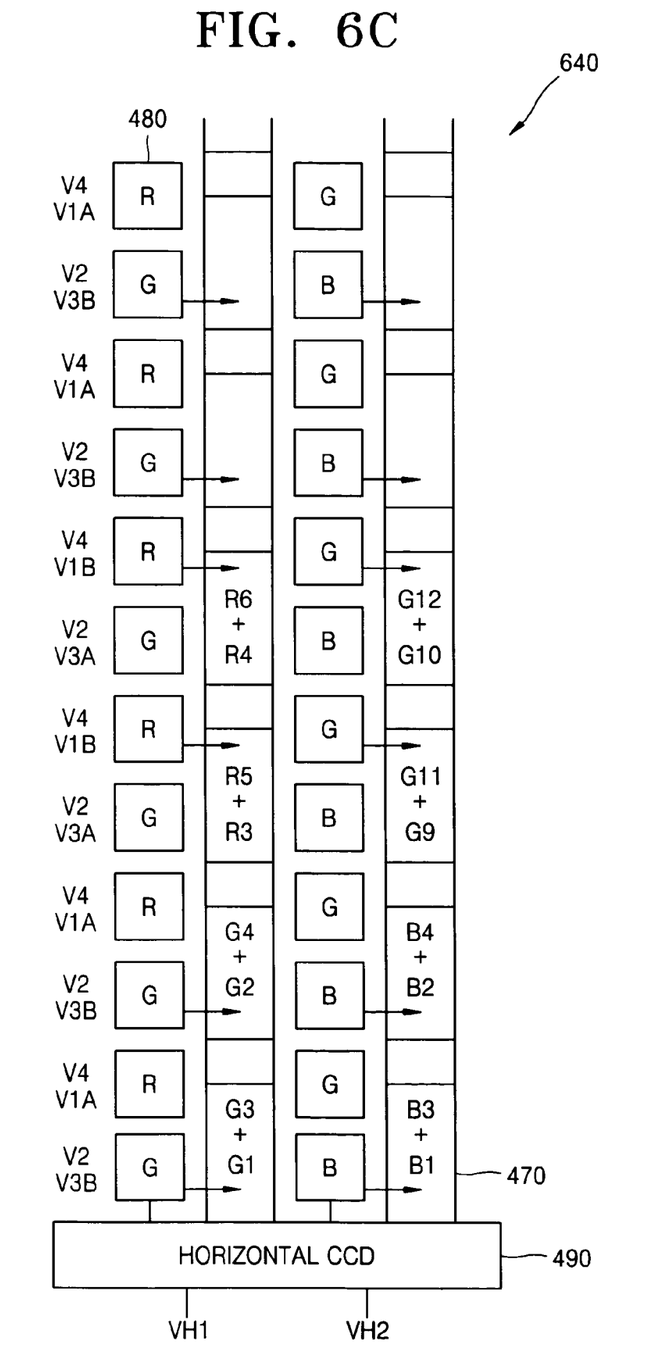

Accordingly, video signals added in the vertical CCD 470 in the second mode period are G1+G3, G2+G4, . . . in the first column and B1+B3, B2+B4, . . . in the second column as shown in FIG. 6*c*.

Thus, in the second mode, the vertical CCD 470 adds the video signals vertically transmitted for four rows in the first mode with respective video signals of the current row, and then outputs to the horizontal CCD 490 through vertical transmission in step S540. Though an example of a sub-sampling mode operation for ¼ vertical resolution reduction is shown here, for vertical resolution reductions of ⅙, ⅛, and 1/10, neighboring video signals of six rows, eight rows, and ten rows, respectively, having an identical color should be added. Accordingly, three, four, and five field packets should be vertically transmitted for six rows, eight rows, and ten rows, respectively, from the vertical CCD 470 in the direction of the horizontal CCD 490. For ⅙, ⅛ and 1/10 vertical resolution reduction, driving electrodes transferring other vertical driving signals than the vertical driving signals (V1A, V1B, V2, V3A, V3B, and V4) can be added. However, when the complexity of wiring is considered, the most preferable one is ¼ vertical resolution reduction in which in the first mode, the vertical CCD 470 receives each of the video signals of two rows placed at interval of one row, vertically transmits for four rows that is twice the number of is the rows, and in the second mode, adds with video signals of a current row, and transmits.

Figure 6D:
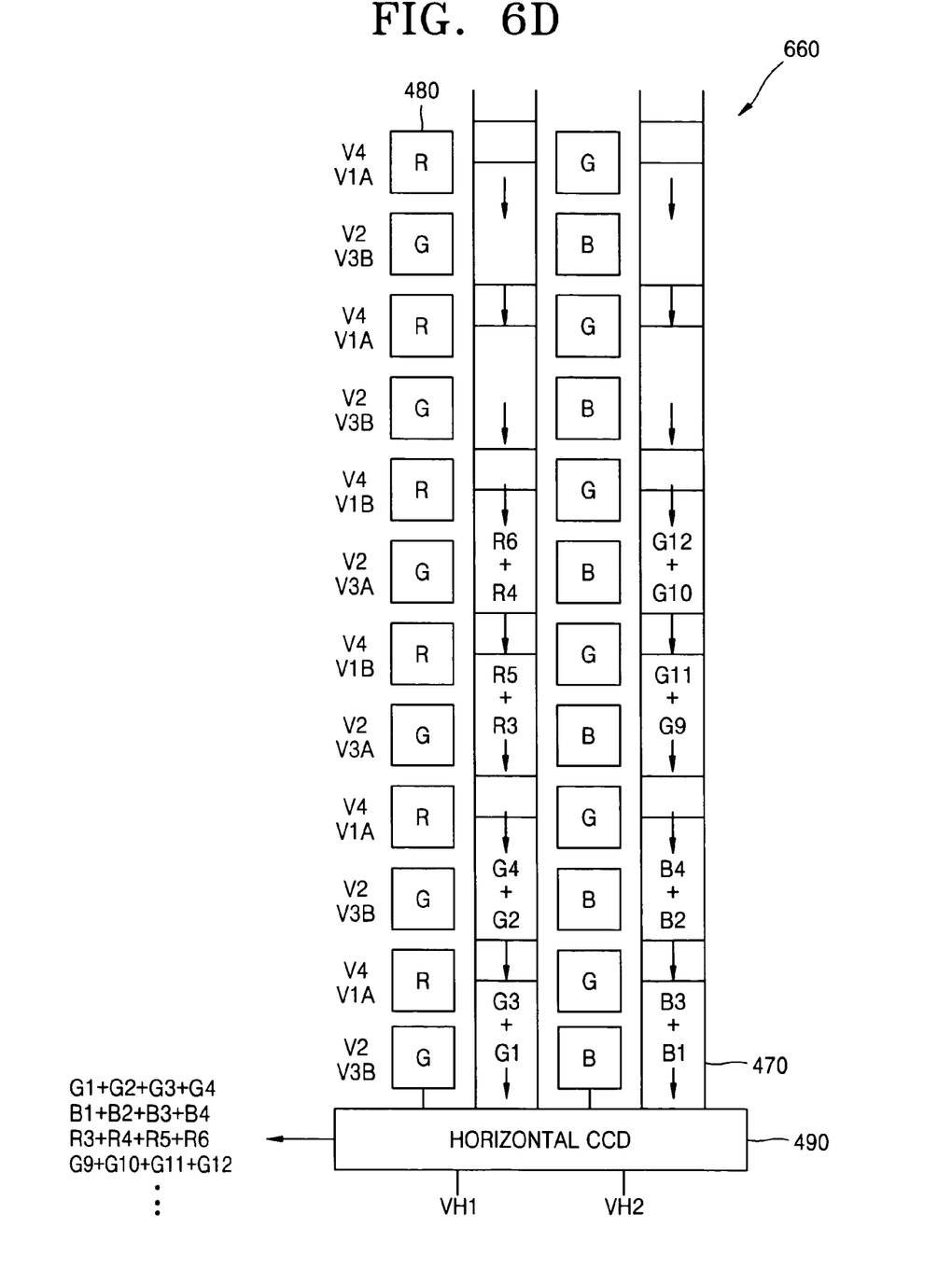

Meanwhile, in the second mode period, the horizontal CCD 490 receives video signals in which V1A and V1B are added and V3A and V3B are added, again adds sequentially each two rows of the received video signals, and outputs the added video signals by row through horizontal transmission in step S550. Since the signal obtained by adding each two rows sequentially in the horizontal CCD 490 is a video signal of the result of adding video signals of four rows, it has a form of G1+G2+G3+G4, B1+B2+B3+B4, R3+R4+R5+R6, and G9+G10+G11+G12, as shown in FIG. 6*d*. The method for transmitting electric charge of the vertical CCD 490 is similar to the method described referring to FIG. 7 and is well known, and therefore the explanation will be omitted here. The first and second modes are repeated in each frame unit and one frame expresses one picture in a display apparatus.

As described above, in the interlacing method in which video signals of 2 pixel photodiodes 480 are added in one vertical CCD 470 transmission end and transmitted, in the sub-sampling mode operation, the solid state image sensing device according to the preferred embodiment of the present disclosure vertically transmits packets adding video signals of predetermined rows without any video signals that are not output and are discarded, and by again adding and outputting the video signals through the horizontal CCD 490, can lower the vertical resolution according to a predetermined level.

As described above, since in the sub-sampling mode operation, the solid state image sensing device according to the present disclosure, utilizes video signals of all rows without any video signals that are not output and are discarded, the size of a signal increases, the dynamic range of an output signal improves, and aliasing noise occurring on a display is reduced. Accordingly, when the device is applied to small-sized mobile systems such as a mobile phone camera and a digital still camera, the quality of display can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

The preferred embodiments should be considered in a descriptive sense only, and not for purposes of limitation. Therefore, the scope of the invention is defined not by the detailed description of the invention but by the appended claims, and all differences within the scope will be construed as being included in the present invention.

What is claimed is:

1. A solid-state image sensing device comprising:
   color photodiodes and luminance photodiodes disposed in a two-dimensional matrix, each photodiode sensing light, converting sensed light into an electric signal;
   a vertical charge coupled device (CCD) which receives the electric signals from each of a plurality of rows corresponding to photodiodes having a particular color or luminance, and generates a first added video signal result by adding in the vertical CCD a first electric signal from a first photodiode having the particular color or luminance with a second electric signal from a second photodiode having the same color or luminance as the first photodiode, wherein the second photodiode is located a proportional number of rows distant from the first photodiode, wherein the proportional number is an integer multiple of the number of the plurality of rows and equal to a reciprocal of a vertical sub-sampling ratio, wherein the integer of the integer multiple is greater than one, and wherein the vertical CCD vertically transmits the first added video signal result;
   and a horizontal CCD which receives a plurality of first added video signal results from the vertical CCD, and generates a second added video signal result by adding sequentially in the horizontal CCD the same number of the first added video signal results for the same color or luminance as the number of the plurality of rows, wherein the horizontal CCD horizontally transmits and outputs the second added video signal results, and
   wherein the number of the plurality of rows is the same for the color photodiodes and for the luminance photodiodes, respectively.

2. The solid-state image sensing device of claim 1, wherein the integer is two.

3. The solid-state image-sensing device of claim 2, wherein the number of the plurality of rows is two rows.

4. The solid-state image-sensing device of claim 2, wherein the number of the plurality of rows is three rows.

5. The solid-state image-sensing device of claim 2, wherein the number of the plurality of rows is four rows.

6. The solid state image sensing device of claim 3, wherein in a first mode, the vertical CCD vertically transmits for four rows, the electric signals from each of two rows having an interval of two rows, and in a second mode, the vertical CCD adds each of the vertically transmitted electric signals with the electric signal of a current row, then vertically transmits the first added video signal result and outputs the first added video signal result to the horizontal CCD, and the first mode and the second mode are repeated in each frame unit.

7. The solid state image sensing device of claim 6, wherein in the first mode, the vertical CCD sequentially vertically transmits for four rows, a first color signal of the two rows having an interval of two rows, and a second color signal of another two rows having an interval of two rows and placed five rows distant from the two rows, and in the second mode, adds each of the vertically transmitted electric signals with the electric signal of a current row, then sequentially vertically transmits the first added video signal result, and outputs the first added video signal result to the horizontal CCD.

8. The solid state image sensing device of claim 7, wherein through another neighboring column, the vertical CCD sequentially vertically transmits for four rows, a third color signal and the first color signal in the first mode, and in the second mode, adds each of the vertically transmitted electric signals with the electric signal of a current row, and then, sequentially vertically transmits the first added video signal result.

9. The solid-state image sensing device of claim 8, wherein the first through third color signals form a Bayer pattern.

10. solid state image sensing device of claim 1, wherein in a sub-sampling mode of driving, the vertical CCD vertically transmits a first added video signal obtained by adding the electric signals of predetermined rows without discarding electric signals.

11. A method for driving a solid-state image-sensing device having color photodiodes and luminance photodiodes disposed in a two-dimensional matrix sensing light, converting the sensed light into an electric signal; the method comprising:

by using vertical driving electrodes that receive inputs of vertical driving signals, receiving electric signals from each of a plurality of rows corresponding to photodiodes having a particular color or luminance generating a first added video signal result by adding in the vertical direction a first electric signal from a first photodiode having the particular color or luminance with the a second electric signal from a second photodiode having the same color or luminance as the first photodiode, wherein the second photodiode is located a proportional number of rows distant from the first photodiode, wherein the proportional number is an integer multiple of the number of the plurality of rows and equal to a reciprocal of a vertical sub-sampling ratio, wherein the integer of the integer multiple is greater than one, and vertically transmitting the first added video signal result; and by using horizontal driving electrodes that receive inputs of horizontal driving signals, receiving a plurality of first added video signal results from the vertical direction, generating a second added video signal result by adding sequentially in the horizontal direction the same number of the first added video signal results for the same color or luminance as the number of the plurality of rows, and horizontally transmitting and outputting the second added video signal results, wherein the number of the plurality of rows is the same for the color photodiodes and for the luminance photodiodes, respectively.

12. The method of claim 11, wherein the integer is two.

13. The method of claim 12, wherein the number of the plurality of rows is two rows.

14. The method of claim 12, wherein the number of the plurality of rows is three rows.

15. The method of claim 12, wherein the number of the plurality of rows is four rows.

16. The method of claim 13, wherein vertically transmitting comprises: in a first mode, vertically transmitting for four rows, the electric signals from each of two rows having an interval of two rows; and in a second mode, adding each of the vertically transmitted electric signals with the electric signal of a current row, then vertically transmitting and outputting the first added video signal result, wherein the first mode and the second mode are repeated in each frame unit.

17. The method of claim 16, wherein the vertically transmitting comprises: in the first mode, sequentially vertically transmitting for four rows, a first color signal of the two rows having an interval of two rows, and a second color signal of another two rows having an interval of two rows and placed five rows distant from the two rows; and in the second mode, adding each of the vertically transmitted electric signals with the electric signal of a current row, then sequentially vertically transmitting the first added video sicinal result to output.

18. The method of claim 17, wherein vertically transmitting comprises: through another neighboring column, sequentially vertically transmitting for four rows, a third color signal and the first color signal in the first mode; and in the second mode, adding each of the vertically transmitted electric signals with the electric signal of a current row, and then, sequentially vertically transmitting the first added video sicinal result.

19. The method of claim 18, wherein the first through third color signals form a Bayer pattern.

20. The method of claim 11, wherein in the step of vertically transmitting, in driving a sub-sampling mode of a solid state image sensing device, a signal obtained by adding the electric signals of predetermined rows without discardgin electric signals is vertically transmitted.

* * * * *